United States Patent [19]

Fournier

[11] 4,207,710
[45] Jun. 17, 1980

[54] WORKPIECE POSITIONING APPARATUS

[75] Inventor: Roger H. Fournier, Millbury, Mass.

[73] Assignee: The Warner & Swasey Company, Cleveland, Ohio

[21] Appl. No.: 941,018

[22] Filed: Sep. 11, 1978

[51] Int. Cl.² ............................................. B24B 5/02
[52] U.S. Cl. .............................. 51/237 CS; 51/101 R; 51/105 SP
[58] Field of Search ........... 51/101 R, 237 R, 237 CS, 51/105 SP

[56] References Cited

U.S. PATENT DOCUMENTS

| | | | |
|---|---|---|---|
| 2,940,227 | 6/1960 | Flohn | 51/237 CS |
| 2,984,955 | 5/1961 | Price | 51/237 R |
| 3,583,108 | 6/1971 | Oishi | 51/237 CS |
| 3,667,167 | 6/1972 | Happel | 51/237 CS |
| 3,769,761 | 11/1973 | Ohsima | 51/237 CS |

*Primary Examiner*—Harold D. Whitehead

[57] ABSTRACT

A workpiece positioning apparatus 12 (FIG. 1) for positively locating a workpiece 14 with respect to a drive spindle 20 in a grinding machine is disclosed. The apparatus 12 is secured to the drive spindle 20 and provides a means for holding the workpiece 14 in a predetermined angular position with respect to the drive spindle during the grinding operation. The apparatus 12 includes an index surface 74 (FIG. 4) against which a key 42 on the workpiece is pressed by a rotatable drive element or sleeve 80. To facilitate installation of the workpiece 14 in the grinding machine 10 (FIG. 1) the drive element 80 (FIG. 4) is rotated to provide a space between it and the index surface 74. When the workpiece 14 has been installed in the machine 10, the drive element 80 is rotated in the opposite direction (FIG. 5) to move the key 42 on the workpiece into engagement with the index surface 74 on the workpiece positioning apparatus 12. Fluid pressure applied against the drive element 80 causes the drive element to rotate and holds the workpiece 14 in a fixed angular relationship with the apparatus 12 and with the drive spindle 20 during rotation in the grinding machine 10.

20 Claims, 9 Drawing Figures

WORKPIECE POSITIONING APPARATUS

BACKGROUND OF THE INVENTION

The present invention relates to an apparatus for positioning a workpiece in a predetermined angular position with respect to a rotatable drive spindle.

When manufacturing a cam shaft, it is necessary to maintain the workpiece in a fixed angular relation with respect to a master cam shaft so that the lobes on the finished product are in proper angular relation with one another. The master cam and the drive spindle rotate in synchronism, thus the workpiece may be maintained in the proper relationship with the master cam by making it rotate with the drive spindle. Various work drives have been devised to accomplish this end.

In a known device, a pair of opposing lock surfaces engage a key which extends from a slot in the workpiece. Both of the lock surfaces are pivotably mounted to a backing plate of the known device, and springs actuate them to engage the key. U.S. Pat. No. 3,667,167 discloses such a device.

The workpiece may be positively located with respect to a rotatable drive spindle using a device like that disclosed in U.S. Pat. No. 2,984,955. In this device the drive spindle extends outward from a drive plate to engage a conical recess located in the end of a longitudinally extending workpiece. The workpiece is rotated about its axis by the drive spindle, and a pin is mounted in the drive plate at a location radially spaced from the spindle. The pin may be moved axially to engage a second recess in the workpiece in order to locate the workpiece in a predetermined angular position with respect to the spindle and drive plate.

SUMMARY OF THE INVENTION

The present invention provides a new and improved workpiece positioning apparatus which holds a workpiece in a predetermined angular position relative to a rotating drive spindle of a machine such as a cam shaft grinder or a pinion gear grinder. The workpiece is provided with a keyway and a key. The apparatus includes a drive element having a drive surface which is rotated into engagement with one side of the key on the workpiece. Further rotation of the drive element rotates the workpiece and brings the opposite side of the key into engagement with an index surface on the positioning apparatus. Holding the key against the index surface maintains the workpiece in a predetermined angular relationship with the drive spindle during a grinding operation.

The workpiece positioning apparatus includes a fluid actuated motor which rotates with the spindle and is operable to rotate the drive element. The fluid motor includes a vane which extends radially outward from the drive element and is rotatably mounted within the body of the motor. The vane forms a movable wall in a pair of variable volume pressure chambers. When fluid under pressure is ported to one of the chambers, the drive element is rotated in one direction relative to the motor body which is fixed to the spindle. Rotation of the drive element in this direction presses the key against the index surface. When fluid pressure is ported to the other chamber, the drive element rotates in the opposite direction, and the key is released.

Accordingly, it is an object of the present invention to provide a new and improved apparatus for positioning a workpiece relative to a drive spindle which is used to rotate the workpiece and wherein the apparatus includes a drive member to move a locating surface connected with the workpiece into engagement with an index surface on the apparatus and to hold the locating surface against the index surface while the workpiece is being rotated by the drive spindle.

It is a further object of the present invention to provide a new and improved workpiece positioning apparatus wherein the apparatus includes a fluid motor which rotates with a spindle and is operable to move a locating surface on the workpiece into engagement with an index surface located in a predetermined position relative to the spindle.

BRIEF DESCRIPTION OF THE DRAWINGS

The foregoing and other objects and features of the present invention will become more apparent from a reading of the following description together with the accompanying drawings in which.

DESCRIPTION OF ONE PREFERRED EMBODIMENT

Figure 1:
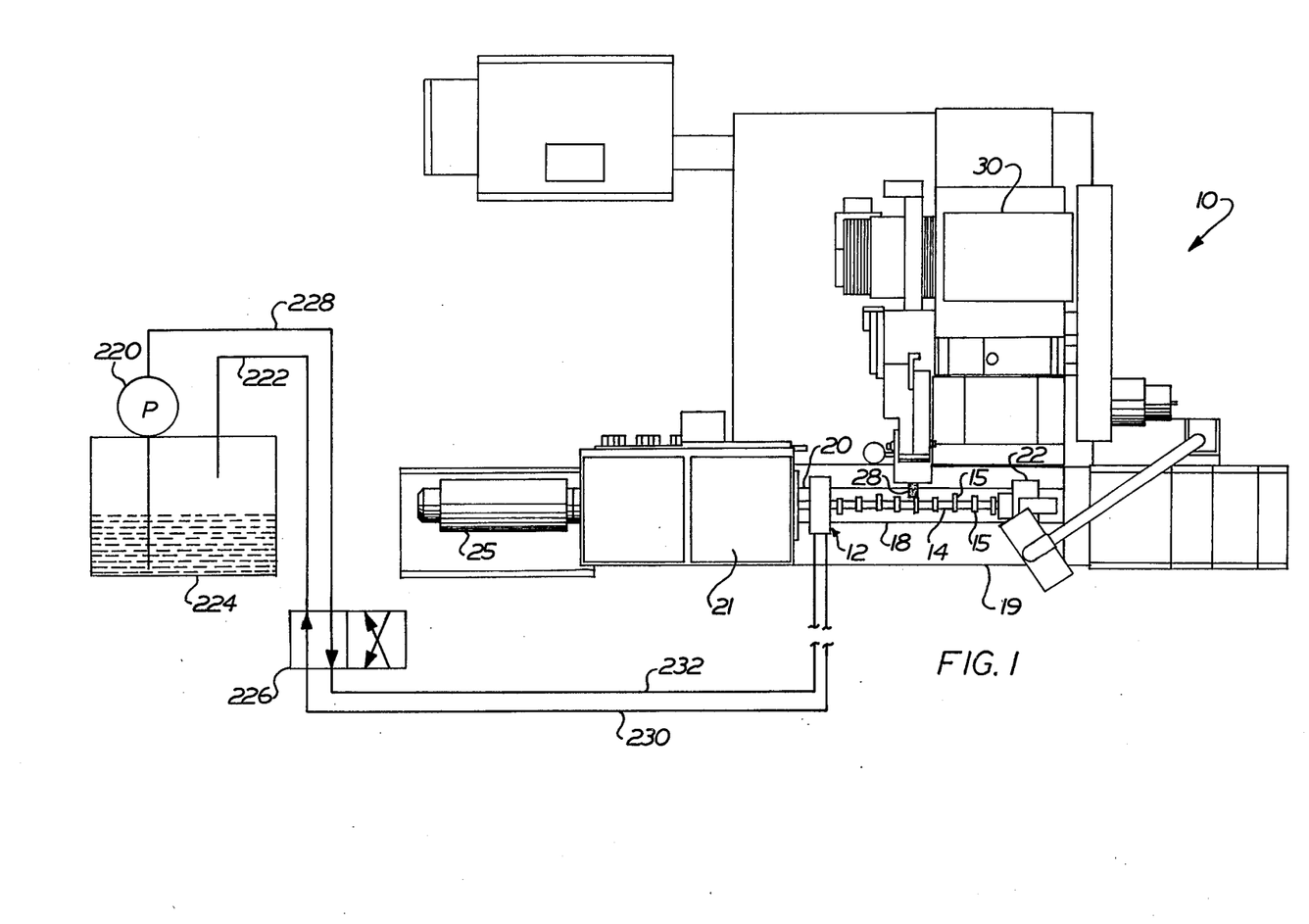
FIG. 1 is a schematic view of a grinding machine equipped with a workpiece positioning apparatus constructed in accordance with the present invention to locate a workpiece relative to a rotatable drive spindle.

A grinding machine 10 equipped with a workpiece positioning apparatus 12 constructed in accordance with the present invention is illustrated in FIG. 1. The grinding machine 10 is used to grind a workpiece 14. Although the workpiece positioning apparatus 12 is described as being installed on a cam shaft grinding machine, it is to be understood that it is equally well adapted for use on other machines in which a workpiece must be held in a fixed angular position with respect to a drive spindle. One such machine is a pinion shaft grinder. Cam shafts which are produced on the grinding machine 10 are used in internal combustion engines to control the opening and closing of valves.

The grinding machine 10 is adapted to form cam lobes 15 on the workpiece 14 which are asymetric with respect to the longitudinal axis of the workpiece. To this end, a cradle 18 on the machine base 19 is rocked in a known manner by a master cam assembly 21. This imparts a rocking movement to the workpiece 14 which is mounted on the cradle 18. A drive spindle 20 and a tailstock 22 are connected with the cradle 18 to support the workpiece.

A motor 25 is connected with the drive spindle 20 to rotate the workpiece 14 about its longitudinal axis. The motor 25 is also connected with the master cam assembly 21 and imparts rotary motion to the master cam assembly 21 in synchronism with the rotation of the workpiece 14. The master cam assembly 21 is engaged by a suitable follower to cause the cradle 18 to rock in synchronism with the rotation of the workpiece 14. The workpiece positioning apparatus 12 holds the workpiece 14 in a predetermined angular position relative to the master cam assembly 21 and the drive spindle 20 during a grinding operation.

The grinding machine 10 also includes a circular grinding wheel 28 which is rotated by a drive motor 30. The grinding wheel 28 rotates about a fixed axis, and the workpiece 14 is brought into selective contact with the grinding wheel by the rocking motion of the cradle 18. Rocking the workpiece 14 while the grinding wheel 28 is rotating forms asymetric cam lobes 15 on the finished camshaft.

The workpiece 14 (FIG. 2) is provided with a locating slot 40 which serves as a reference so that the lobes on the finished camshaft will be in proper angular relationship to one another. The locating slot 40 is milled into the workpiece 14 and receives a key 42. During grinding of the workpiece 14 the workpiece positioning apparatus 12 engages the key 42 and holds it in a fixed angular relationship with the drive spindle 20.

The workpiece positioning apparatus 12 is disposed in coaxial relationship with the spindle 20 and the workpiece 14 and is effective to hold the workpiece in a fixed angular position with respect to the drive spindle and thus with the master cam assembly 21. When the workpiece 14 is mounted in the workpiece positioning apparatus 12, the apparatus 12 engages the key 42 to rotate the workpiece to a predetermined angular relationship with respect to the drive spindle 20. The apparatus 20 is effective to positively locate the workpiece 14 in a predetermined angular relationship with the spindle 20 and to maintain the predetermined angular relationship between the workpiece 14 and spindle 20 during grinding of the cam lobes 15. This assures that the lobes on the finished camshaft are in the correct angular position relative to the key 42.

The workpiece positioning apparatus 12 constructed in accordance with the present invention includes a cylindrical body member 50 (FIG. 2) which is adjustably connected in a coaxial relationship with the drive spindle 20 (FIG. 3) for rotation therewith. A central cylindrical passage 52 supports the workpiece positioning apparatus 12 on the drive spindle 20. The body member 50 carries a pair of opposed positioning or adjusting screws 54 and 56. The screws 54 and 56 engage opposite faces of a key 58 which extends radially outward from a slot 60 in the drive spindle 20. The screws 54 and 56 may be adjusted to change the angular position of the body member 50 on the drive spindle 20.

Figures 3, 9:
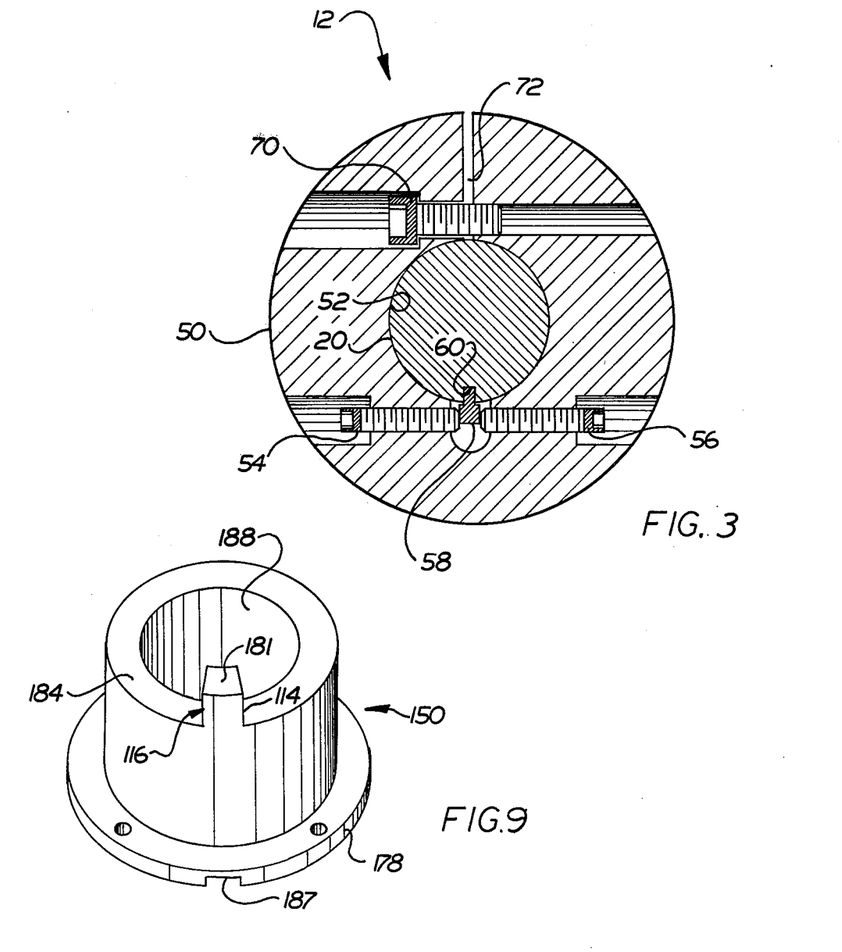
FIG. 3 is a sectional view taken along line 3—3 of FIG. 2 showing an opposed pair of screws for adjusting the workpiece positioning apparatus to a desired angular position with respect to the drive spindle, and a clamping screw to maintain the apparatus in the desired position.
FIG. 9 (on sheet 3 of the drawings) is a pictorial illustration of a component of the workpiece positioning apparatus of FIG. 2.

The body member 50 also carries a clamping bolt 70 which may be tightened to hold the body member 50 in the desired angular position. The clamping bolt 70 extends across a slot 72 which extends radially outward from central cylindrical passage 52 through the body member 50. Tightening the bolt 70 draws opposite sides of the slot 72 closer together to clamp the body member 50 tightly to the drive spindle 20.

The workpiece positioning apparatus 12 constructed in accordance with the present invention includes a drive surface 73 (FIG. 4) which is rotatable with respect to the body member 50 to engage the key 42 and to press the key against an index surface 74. The index surface 74 is fixedly connected with the body member 50, which in turn is connected with the drive spindle 20. Therefore, holding the key 42 (FIG. 5) against the index surface assures that the workpiece 14 (FIG. 1) is held in a fixed angular relationship with the drive spindle 20 and the master cam assembly 21 during the grinding operation.

Figure 4:
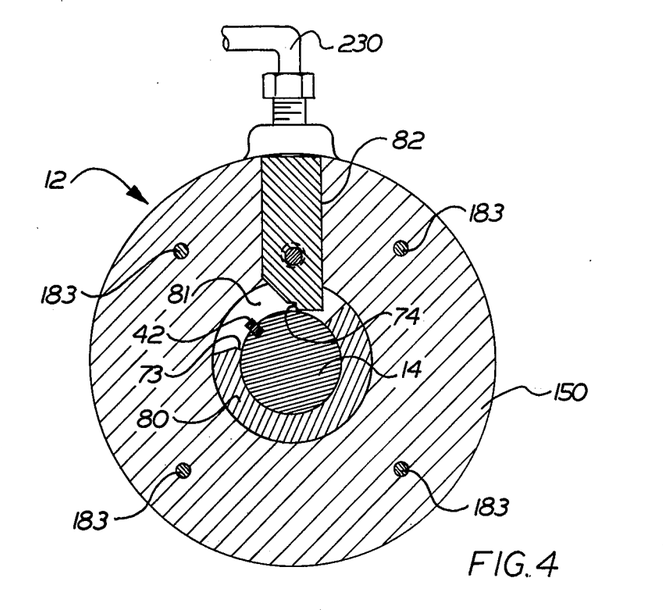
FIG. 4 is a sectional view taken along line 4—4 of FIG. 2 and showing the angular relationship of the workpiece relative to an index surface on the body of the apparatus prior to engagement by a drive surface on a rotatable drive member.
Figure 5:
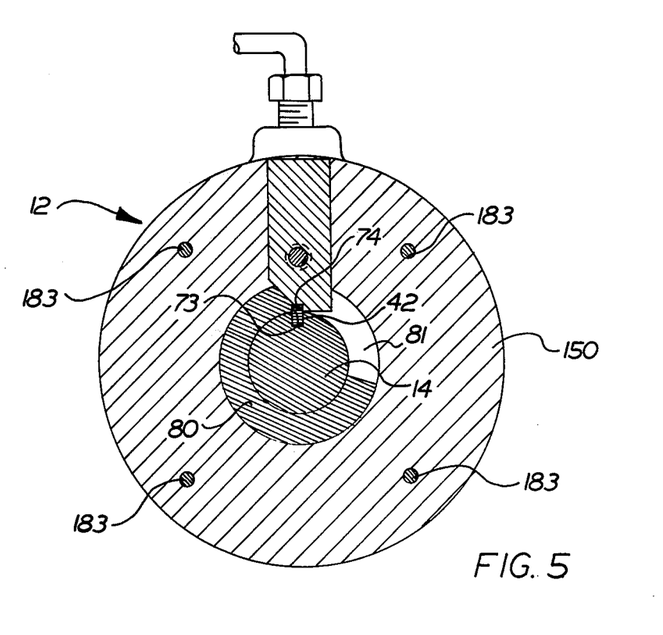
FIG. 5 is a sectional view similar to FIG. 4 but showing the workpiece after it has been located relative to the drive spindle by engagement of the drive surface and the index surface.
Figure 6:
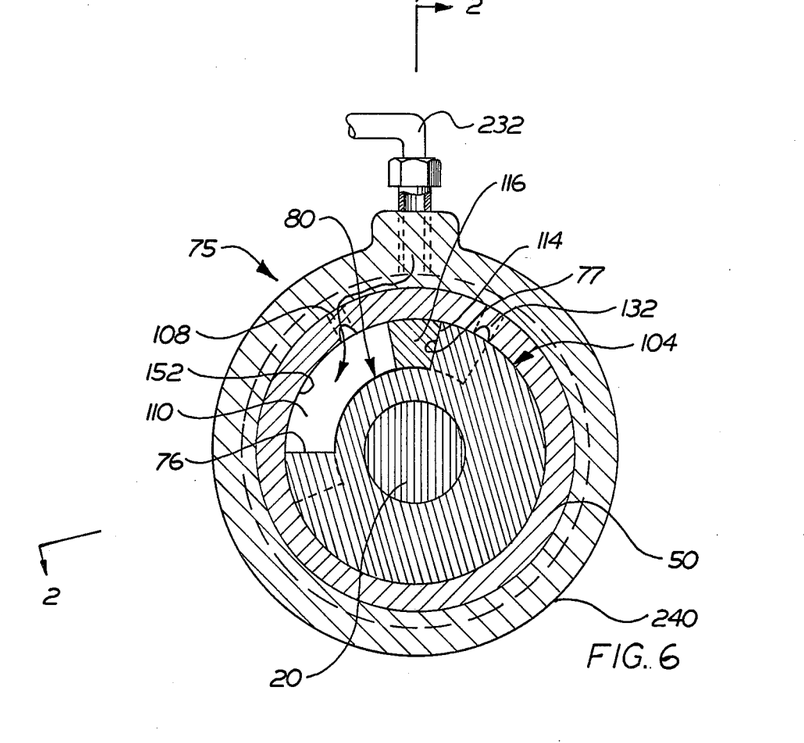
FIG. 6 is a front sectional view, taken along line 6—6 of FIG. 2 showing the construction of a fluid motor which is operable to move the drive surface from the position shown in FIG. 4 to the position shown in FIG. 5, the motor being shown in a position corresponding to the position of the drive surface in FIG. 4.
Figure 7:
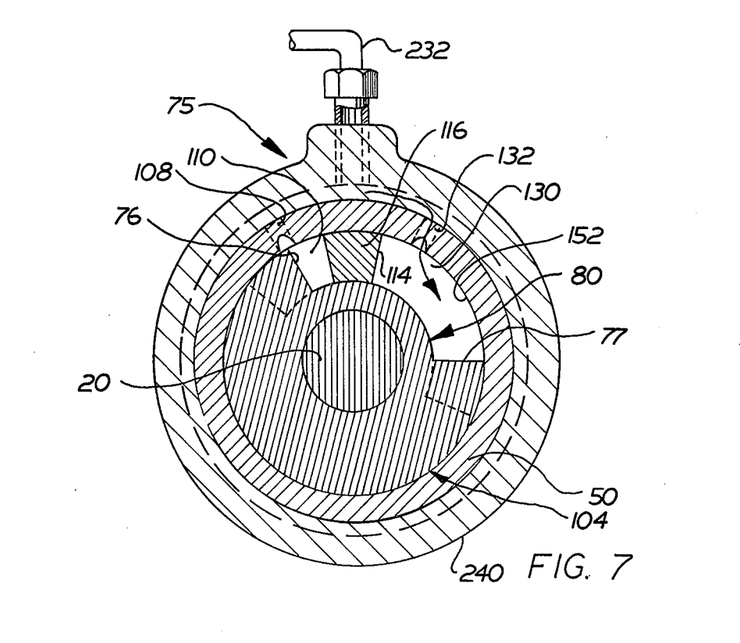
FIG. 7 is a sectional view similar to FIG. 6 but showing the motor in a position corresponding to the position of the drive surface in FIG. 5.

A fluid motor indicated generally by the numeral 75 in FIGS. 6 and 7 is effective to move the drive surface 73 between the position shown in FIG. 4 and the position shown in FIG. 5 to locate the workpiece 14 in a predetermined angular position relative to the spindle 20. The body member 50 (FIG. 6) of the fluid motor 75 rotates with the spindle 20 and maintains the predetermined angular relationship between the workpiece 14 and the spindle 20 during a grinding operation.

The fluid motor 75 (FIGS. 6 and 7) includes a generally cylindrical rotatable drive element or sleeve 80 which is coaxial with the body member 50 and has an outwardly extending vane 104. Fluid pressure is applied to a surface 76 on the vane 104 to cause the tubular drive element 80 to rotate about its longitudinal axis to the release position shown in FIG. 6. This moves the drive surface 73 to the position shown in FIG. 4. When the drive surface 73 is in this position (FIG. 4), it is separated from the index surface 74 and defines a cavity for receiving the key 42 connected with the workpiece 14.

Fluid pressure applied to a surface 77 (FIG. 7) on the vane 104 causes the drive element 80 to rotate in the opposite direction toward the clamp position shown in FIG. 7. This causes the drive surface 73 to rotate to the position shown in FIG. 5. The fluid pressure against the surface 77 causes the drive element 80 to press the drive surface 73 against the key 42. This presses the key 42 against the index surface 74 to hold the workpiece 14 in a fixed angular relationship with respect to the rotatable drive spindle 20 (FIG. 1) during a grinding operation. Surfaces 76 and 77 extend into vane 104 to define recessed portions so that ports 108 an 132 are not blocked during operation.

When the fluid motor 75 moves the drive surface 73 toward the index surface 74 (FIG. 5), the index surface and the drive surface securely hold the key 42 therebetween to positively locate the workpiece in a fixed angular relationship with the drive spindle 20 (FIG. 1) during a grinding operation. The drive surface 73 (FIGS. 4 and 8) of the workpiece positioning apparatus 12 is an axially extending face in an arcuate recess 81 formed in the drive element or sleeve 80. The index surface 74 extends into the drive element recess 81 and opposes the drive surface 73.

The workpiece 14 is inserted into the workpiece positioning apparatus 12 when the apparatus is in the release position shown in FIG. 4. The machine operator inserts the workpiece 14 with the key 42 at any angular position, so long as the key is between the drive surface 73 and the index surface 74. Regardless of where between these two angular extremes the workpiece 14 is installed, actuation of the apparatus 12 moves the key 42 and the workpiece to the position shown in FIG. 5.

The motor 75 is operated to the release condition shown in FIGS. 4 and 6 under the influence of fluid pressure. Fluid under pressure supplied through a release port 108 (FIG. 6) to a release chamber 110 applies force to the vane surface 76 on the vane 104. The increasing volume of fluid in the release chamber 110 moves the rotatable drive element 80 counterclockwise until it reaches the position shown in FIG. 6. Simultaneously the vane surface 77 on the vane 104 forces fluid out of the clamp chamber 130 through the clamp port 132 as the sleeve 80 moves counterclockwise. Counterclockwise motion is limited by abutting engagement of surface 77 with one side 114 of the fixed vane 116 of the cap 150.

Figure 2:
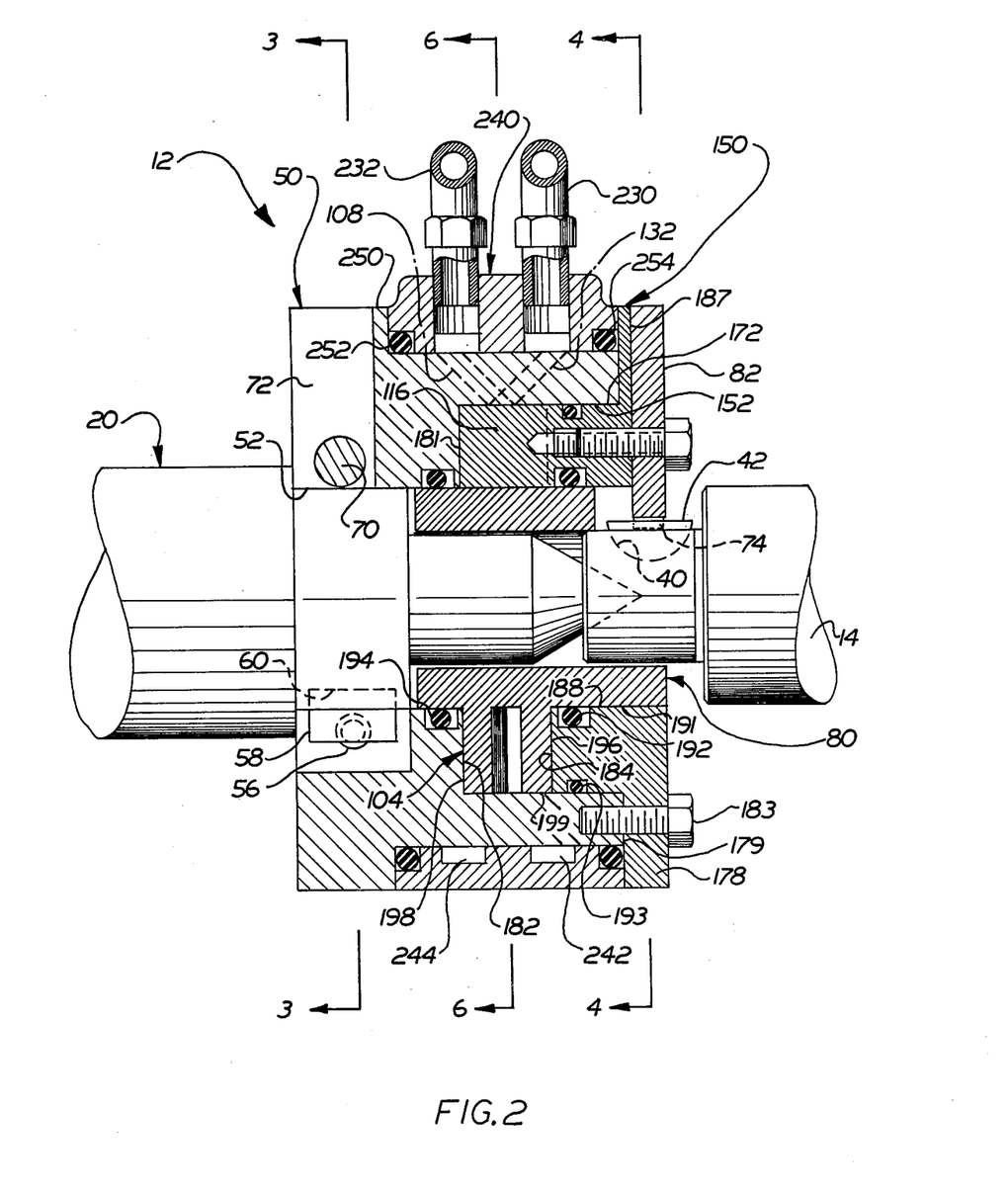
FIG. 2 is a sectional view taken along line 2—2 of FIG. 6 of the workpiece positioning apparatus of FIG. 1 showing the relationship between the drive spindle, the workpiece positioning apparatus, and the workpiece.

Once the machine operator has inserted the workpiece 14 into the grinding machine 10 as shown in FIGS. 1 and 2, the fluid supply and return are reversed. This causes the workpiece positioning apparatus 12 to move the workpiece 14 to, and hold the workpiece in, a predetermined angular position with respect to the drive spindle 20.

To effect operation of the fluid motor 75 from the release condition of FIG. 6 to the clamp condition of FIG. 7, fluid at a high pressure is supplied to the clamp chamber 130. The fluid presses against the vane surface 77 and moves the rotatable sleeve 80 clockwise. Fluid which was formerly in the release chamber 110 is driven out through the release port 108. Clockwise motion continues until the drive surface 73 (FIG. 5) forces the key 42 against the index surface 74. The key 42 will stay in this position relative to the workpiece positioning apparatus 12 as long as fluid pressure is maintained in the clamp chamber 130 (FIG. 7).

Figure 8:
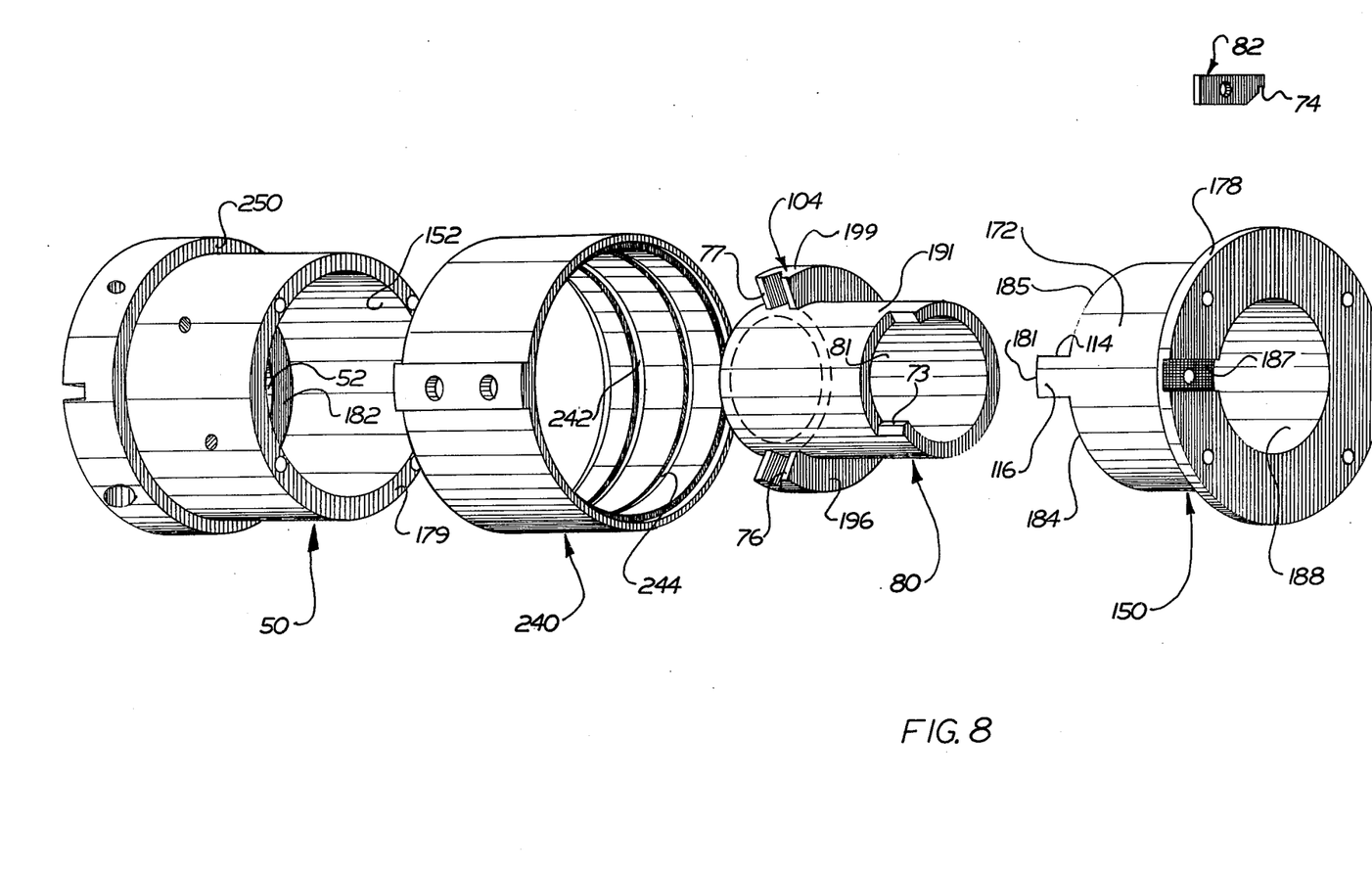
FIG. 8 is an exploded pictorial illustration of a portion of the workpiece positioning apparatus of FIG. 2.

The index surface 74 which the key 42 abuts (FIGS. 2, 4, and 5) and the locating block 82 of which the index surface is a part are held rigidly to the cap 150. A rectangular recess 187 (FIG. 8) in an end face of the shoulder 178 of the cap 150 receives the locating block 82 (FIGS. 2, 4 and 8). A fastener such as bolt 187a may be used to hold the block 82 in the recess 187.

The body member 50 and the cap 150 (FIG. 8) cooperate to form the fixed walls of the arcuate clamp and release chambers 110 and 130 (FIG. 6). When the cap 150 (FIGS. 2 and 8) and the rotatable sleeve 80 are telescopically inserted into the body member 50, two fluid tight chambers, the clamp chamber 130 (FIGS. 6 and 7) and the release chamber 110, are formed. The body member 50 (FIGS. 2 and 8) has a central cylindrical passage 152 with smooth walls. The cylindrical outside surface 172 of the cap 150 sealingly engages portions of the cylindrical passage 152.

When the cap 150 (FIGS. 2 and 8) is inserted into the body member 50 in coaxial relationship therewith, a radially extending annular shoulder 178 on the cap abuts an annular end 179 of the body member 50, and the end face 181 (FIGS. 2 and 9) of the fixed vane 116 abuts a radially extending annular surface 182 (FIG. 8) in the body member. Together the contact of shoulder 178 (FIG. 2) with surface 179 and the contact surface 181 (FIGS. 2 and 9) with surface 179 (FIGS. 2 and 8) limit axial motion in one direction of the cap 150 with respect to the body member 50. Suitable bolts 183 (FIG. 2) may be used to hold the cap 150 against axial motion relative to the body member 50 in the opposite direction.

The annular surface 182 of the body member 50 forms one wall of the clamp chamber 130 (FIG. 7) and the release chamber 110 (FIG. 6) (the left hand wall as viewed in FIG. 2). The annular surface 182 projects radially inward from the cylindrical surface 152 against which the outside 172 of the cap 150 fits. The annular surface 182 connects surface 152 with the concentric cylindrical passage 52 through which the spindle 20 extends.

The arcuate end surface 184 (FIGS. 2 and 9) of the cap 150 is parallel to annular surface 182 (FIG. 2) of the body member 50 and forms a wall of the clamp (FIG. 7) and release chambers 110 and 130 (FIGS. 6 and 7) opposite the surface 182 (the right hand wall as viewed in FIG. 2). The surfaces 182 and 184 are spaced from each other a distance equal to the thickness of the vane 104 which is part of the drive member 80. The vane 104 is slidably disposed between the parallel surfaces 182 and 184.

The side surface 196 (the right side surface in FIGS. 2 and 8) of the vane 104, slidably and sealingly engages the arcuate end surface 184 of the cap 150. The opposite flat side surface 198 (FIG. 2) of the vane 104 is in sliding, sealing engagement with the annular surface 182 of the main body member 50. The cylindrical outside surface 199 (FIG. 8) of vane 104 slidably engages the cylindrical wall 152 of the passage through the body member 50.

The arcuate end surface 184 (FIGS. 2, 8, and 9) of the cap 150 does not form a full circle, but is interrupted by the fixed vane 116 which extends axially beyond the end surface 184 a distance equal to the thickness of the vane 104 (FIGS. 2 and 8) on the drive member 80. The fixed vane 116 forms a dividing wall between the clamp and release chambers 110 and 130 (FIGS. 6 and 7). Sealing engagement between end face 181 (FIGS. 2 and 8) of fixed vane 116 and surface 182 in the body member 50 and between the curved outside surface 172 of the cap 150 and passage 152 in the body member 50 prevents fluid communication between the release chamber 110 and the clamp chamber 130.

The rotatable drive element or sleeve 80 fits within the generally tubular cap 150. The surface of a central cylindrical passage 188 through the cap 150 is disposed in sliding, abutting engagement with the outside surface 191 (FIG. 8) of the rotatable sleeve 80. A seal between the rotatable sleeve 80 and the cap 150 is maintained by use of an oil seal, such as an o-ring 192 (FIG. 2). Similar seals 193 and 194 prevent excess leakage between the cap 150 and the body member 50 and between the rotatable sleeve 80 and body member 50.

Fluid is supplied under pressure by a pump 220 (FIG. 1) to operate the workpiece positioning apparatus 12. The fluid may be liquid hydraulic fluid, or the fluid may be a gas, such as air. In one preferred embodiment the fluid is liquid, and consequently a return line 222 and a tank 224 are utilized. However, it is to be understood that the workpiece positioning apparatus 12 of the present invention contemplates using either a gaseous fluid or liquid fluid as the operating medium.

Fluid is supplied to a two position flow control valve 226 through conduit 228. One position of the two position valve 226 ports high pressure fluid through a flexible conduit 230 to the clamp chamber 130 (FIG. 7). This causes the sleeve 80 to move to the clamp position shown in FIG. 7. Fluid expelled from the release chamber 110 flows to the tank 224 (FIG. 1) through a flexible conduit 232. Moving the valve 226 to its other position reverses the flows in the conduits 230 and 232, thus moving the drive member 80 and the vane 104 to the release position shown in FIG. 6.

A slip ring 240 (FIG. 2) is coaxial with the body member 50 and is adapted to supply fluid to the body member 50 while the body member is rotating with the drive spindle 20. The inside diameter of the annular slip ring 240 is the same as the outside diameter of the body member 50. A pair of annular grooves 242 and 244 circumscribe the inside of the ring 240. Conduit 230 is in communication with groove 242, and conduit 232 is in fluid communication with the groove 244.

The slip ring 240 is held against axial motion in one direction by a radially extending shoulder 250 on the body member 50 and in the other direction by the shoulder 178 on the cap 150. Suitable o-ring seals 252 and 254 provide a seal between the slip ring 240 and the body member 50.

The clamp and release ports 132 and 108 (FIGS. 6 and 7) connect the clamp and release chambers 130 and 110 with the grooves 242 and 244 (FIG. 2) to enable fluid to flow into and out of the chambers through the conduits 230 and 232. The clamp port 132 (FIGS. 6 and 7) extends from the outside surface of the body member 50 to the clamp chamber 130. The release port 108 extends from the outside surface through the body member to the release chamber 110. The slip ring 240 thus provides fluid communication between the conduits 230 and 232 and the ports 132 and 108, respectively, in the body member 50. The slip ring 240 remains stationary while the body member rotates during the grinding of the workpiece 14.

Although the work positioning apparatus is provided with seals 192, 193, 194, 242, 244, 252, and 254 these seals are not effective to prevent all leakage. It is intended that some fluid leak past the seals because this fluid carries with it any abrasive particles which might accumulate on the apparatus 12. The leakage past seals 192, 193, 194, 242, and 244 provides lubrication and a self-cleaning capability to the workpiece positioning apparatus 12.

Thus it is clear that the present invention provides a new and improved workpiece positioning apparatus 12 which holds a workpiece 14 (FIG. 1) in a predetermined angular position relative to a rotating drive spindle 20 of a machine 10 such as a cam shaft grinder or a pinion gear grinder. The workpiece 14 is provided with a keyway 40 (FIG. 2) and a key 42. The apparatus 12 includes a drive element 80 (FIG. 4) having a drive surface 73 which is rotated into engagement with one side of the key 42 on the workpiece 14. Further rotation of the drive surface 73 rotates the workpiece 14 and brings the opposite side of the key 42 into engagement with an index surface 74 (FIG. 5) on the positioning apparatus 12. Holding the key 42 against the index surface 74 maintains the workpiece 14 in a predetermined angular relationship with the drive spindle 20 and thus with a master cam assembly 21 (FIG. 2) during a grinding operation.

The workpiece positioning apparatus 12 (FIG. 6) includes a fluid actuated motor 75 which rotates with the spindle 20 and is operable to rotate the drive element 80. The fluid motor 75 includes a vane 104 which extends radially outward from the drive element 80. The end faces 76 and 77 of the vane 104 form movable walls in a pair of variable volume pressure chambers 110 and 130. When fluid under pressure is ported to one of the chambers (i.e., 130), the drive element 80 is rotated in one direction (i.e., clockwise, FIG. 7) relative to the spindle 20 to press the key 42 (FIG. 5) against the index surface 74. When fluid pressure is ported to the other chamber (i.e., 110), the drive element 80 rotates in the opposite direction, and the key 42 is released (FIG. 4).

Slip ring 240 (FIGS. 2 and 8) enables hydraulic fluid to reach the pressure chambers 110 and 130 (FIG. 6) while the workpiece positioning apparatus 12 is rotating during a grinding operation. Two ports 108 and 132 are provided to conduct hydraulic fluid into the pressure chambers 110 and 130 from a cylindrical outside surface of the main body 50 of the workpiece positioning apparatus 12. The ports 108 and 132 are axially displaced and each is aligned with an annular groove 242 and 244 (FIG. 2) in the slip ring 240. Conduits 230 and 232 which supply hydraulic fluid are connected to the slip ring 240 and each is in fluid communication with one of the annular grooves 242 and 244. Thus fluid communication is maintained between the conduits 230 and 232 and the ports 108 and 132 (FIG. 6) leading to the pressure chambers 110 and 130 even when the workpiece positioning apparatus 12 is rotating.

What is claimed is:

1. An apparatus for positioning a workpiece in a predetermined angular relationship with a rotatable drive spindle, said apparatus comprising connector means for connecting at least a portion of said apparatus with the drive spindle for rotation therewith, an index surface disposed in a predetermined angular position relative to the drive spindle, drive surface means for engaging the workpiece and moving a locating surface on the workpiece relative to said drive spindle from a position spaced from said index surface into abutting engagement therewith, means for supporting said drive surface means for movement relative to the drive spindle and index surface along a circular path coaxial with the axis of rotation of the drive spindle, and motor means for moving said drive surface means relative to said drive spindle and index surface along the circular path and for pressing the locating surface on the workpiece against said index surface to hold the locating surface in abutting engagement with said index surface during rotation of the drive spindle.

2. An apparatus as set forth in claim 1 wherein said connector means includes means for adjusting the angular relationship of said index surface relative to the spindle and for maintaining the angular relationship between said index surface and spindle constant during rotation of the spindle and said apparatus.

3. An apparatus as set forth in claim 1 wherein said motor means includes a fluid chamber which is at least partially defined by fixed walls disposed in a predetermined relationship with the spindle and a movable wall disposed in sliding engagement with said fixed walls and connected with said drive surface means, said apparatus further including means for supplying fluid under pressure to said fluid chamber to cause said movable wall to move in one direction with respect to said fixed walls to effect movement of said drive surface into engagement with the workpiece, to effect movement of the locating surface into engagement with said index surface, and to effect application to the workpiece of a force which presses the locating surface against said index surface.

4. An apparatus as set forth in claim 3 wherein said motor means further includes a second fluid chamber which is at least partially defined by fixed walls disposed in a predetermined angular relationship with the spindle and a second movable wall disposed in sliding engagement with said fixed walls and connected with said drive surface means, said apparatus further including means for supplying fluid under pressure to said second fluid chamber to cause said second movable wall to move in a second direction with respect to said fixed walls to effect movement of said drive surface away from said index surface.

5. An apparatus as set forth in claim 3 wherein said motor means includes means for connecting said movable wall with said drive surface means for rotation therewith about a common axis, said drive surface means being disposed closer to the common axis than said movable wall.

6. An apparatus as set forth in claim 5 wherein said drive surface means is offset from said movable wall along their common axis.

7. An apparatus as set forth in claim 3 wherein said fixed and movable walls at least partially define an arcuate chamber and said movable wall moves along a curved path to vary the size of said arcuate chamber.

8. An apparatus as set forth in claim 1 wherein said connector means includes means for connecting said motor means with the spindle for rotation therewith.

9. An apparatus as set forth in claim 8 wherein said motor means includes a fluid motor having a drive element which is movable relative to the spindle, said drive surface means being connected with said drive element for movement therewith relative to the spindle.

10. An apparatus for positioning a workpiece in a fixed angular relationship with a rotatable spindle by engaging a key connected with the workpiece, said apparatus comprising connector means for connecting at least a portion of said apparatus with the spindle for rotation therewith, an index surface disposed in a fixed relationship with the spindle, a rotatable drive member adapted to engage one side of the key, and to rotate the key and workpiece together relative to the spindle about the axis of rotation of the spindle, means for supporting said drive member for rotation relative to the spindle and index surface along a circular path coaxial with the axis of rotation of the spindle, and motor means connected with the spindle for rotation therewith for moving said drive member relative to the spindle along the circular path into engagement with the one side of the key, for moving the opposite side of the key into abutting engagement with said index surface, and for applying a force to the one side of the key to hold the opposite side of the key in engagement with said index surface during rotation of the spindle and said apparatus.

11. An apparatus as set forth in claim 10 wherein said motor means includes a fluid chamber which is at least partially defined by fixed walls disposed in a predetermined angular relationship with the spindle and a movable wall disposed in sliding engagement with said fixed walls and connected with said drive member, said apparatus further including means for supplying fluid under pressure to said fluid chamber to cause said movable wall to move in one direction with respect to said fixed walls to effect movement of said drive member to move toward the key and to effect movement of the key into engagement with said index surface, and to effect application to the workpiece of a force which presses the key against said index surface.

12. An apparatus as set forth in claim 11 wherein said motor means further includes a second fluid chamber which is at least partially defined by fixed walls disposed in a predetermined angular relationship with the spindle and a second movable wall disposed in sliding abutting engagement with said fixed walls and connected with said drive member, said apparatus further including means for supplying fluid under pressure to said second fluid chamber to cause said second movable wall to move in a second direction with respect to said fixed walls to effect movement of said drive member away from the key.

13. An apparatus as set forth in claim 11 wherein said drive member includes drive surface means for engaging one side of the key and means for connecting said movable wall with said drive surface means for rotation therewith about a common axis, said drive surface means being disposed closed to the common axis than said movable wall.

14. An apparatus as set forth in claim 13 wherein said drive surface means is offset from said movable wall along their common axis, said drive surface means being displaced axially from said movable wall.

15. An apparatus as set forth in claim 10 wherein said fixed walls and said movable wall define an arcuate chamber and said movable wall moves in a curved path to vary the size of said arcuate chamber.

16. An apparatus as set forth in claim 10 wherein said connector means includes means for connecting said motor means with the spindle for rotation therewith.

17. A workpiece positioning apparatus, operable by pressurized fluid, for engaging a key connected to the workpiece to positively locate the workpiece with respect to a rotatable drive spindle, said workpiece positioning apparatus comprises:
 a cylindrical body which is adjustably connected in a coaxial relationship with the drive spindle for rotation therewith;
 an index surface fixed to said cylindrical body;
 a cylindrical drive member disposed within said cylindrical body for relative rotary movement with respect to said cylindrical body;
 a drive surface, formed upon said cylindrical drive member, separated from said index surface to define a cavity for receiving the key connected to the workpiece and being movable along a circular path coaxial with the axis of rotation of said drive spindle toward and away from said index surface;
 fluid drive means for moving said drive surface along said circular path toward said index surface to securely hold the key therebetween for positively locating the workpiece with respect to the rotatable drive spindle and for moving said drive surface away from said index surface to release the key.

18. A workpiece positioning apparatus as claimed in claim 17 wherein said fluid drive means comprises:
 a pair of fluid drive chambers defined between portions of said cylindrical body and portions of said cylindrical drive member;

a slip ring connected around said body having a pair of annular chambers formed therein for carrying fluid;

ports communicating from the pair of annular chambers of said slip ring to said pair of fluid drive chambers; and valve means for selectively connecting pressurized fluid to one of the annular chambers formed in said slip ring for positioning said body member with respect to said cylindrical drive member.

19. An apparatus for positioning a workpiece in a predetermined angular relationship with a rotatable spindle by engaging a key which projects outwardly from the workpiece and is disposed in a predetermined position relative to the workpiece, said apparatus comprising a housing connected with the spindle for rotation therewith, said housing including means for defining a chamber having first and second end surfaces, a reference surface fixedly connected with said housing and disposed in a predetermined position relative to the spindle, a movable drive member disposed in said chamber, said drive member being effective to divide said chamber into first and second variable volume portions, said drive member having a first side surface facing toward said first end surface of said chamber with the first variable volume portion of said chamber disposed therebetween and a second side surface facing toward said second end surface of said chamber with the second variable volume portion of said chamber therebetween, drive surface means connected with said drive member for engaging a side of the key in the workpiece, stationary manifold means circumscribing said housing for conducting fluid pressure from a source of fluid pressure to the first and second variable volume portions of said chamber during rotation of said housing with the spindle relative to said manifold means, said manifold means including a first fluid passage connected in fluid communication with said first variable volume portion of said chamber and second fluid passage connected in fluid communication with said second variable volume portion of said chamber, and a valve means connected in fluid communication with said manifold means and the source of fluid pressure and operable between first and second conditions, said valve means being effective in said first condition to port fluid pressure to said first passage in said manifold means and said first variable volume portion of the chamber to apply fluid pressure against said first side surface of said drive member to urge said drive member to a first position in which said drive surface means is spaced from said reference surface, said valve means being effective in said second condition to port fluid pressure to said second passage in said manifold means and said second variable volume portion of said chamber to apply fluid pressure against said second side surface of said drive member to move said drive member from the first position toward a second position to press said drive surface means against a first side of the key to rotate the key and workpiece about the central axis of the spindle, said drive member being effective in the second position to hold the second side of the key against said reference surface during rotation of said housing, spindle and workpiece relative to said manifold means.

20. An apparatus as set forth in claim 19 wherein said chamber has an arcuate longitudinally extending central axis with a center of curvature which is disposed on the axis of rotation of the spindle, said drive member being movable along an arcuate path which is coaxial with the axis of rotation of the spindle upon movement of said drive member between the first and second positions.

* * * * *